A. SPATZ.
NUT LOCK.
APPLICATION FILED NOV. 8, 1912.
1,155,286.
Patented Sept. 28, 1915.
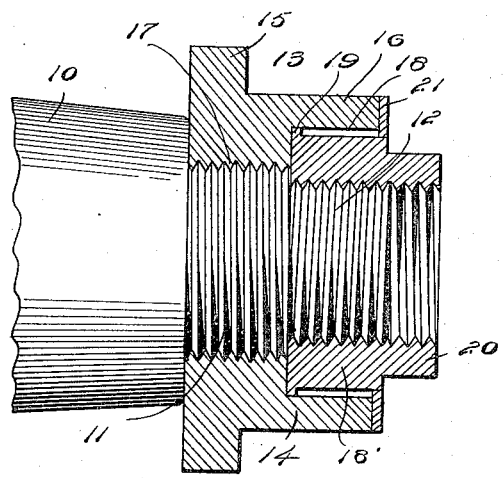
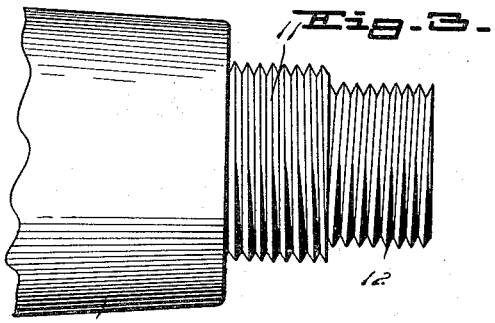
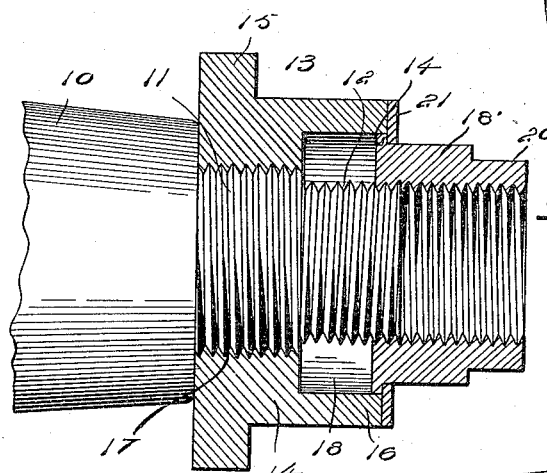
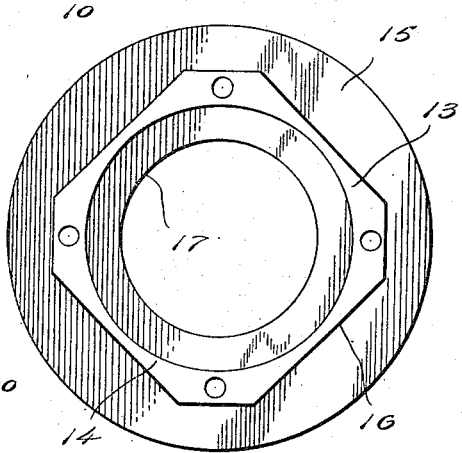
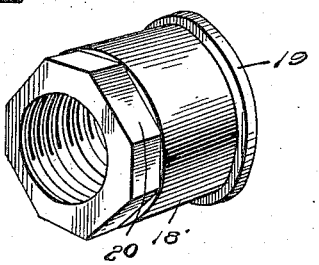
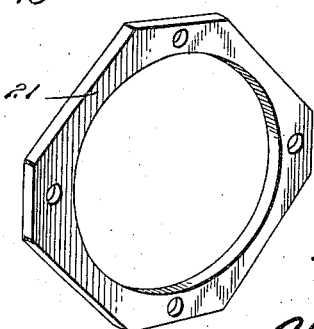
Witnesses
Chas. E. Kemper.
Wm. J. Loerth.
Inventor
Albert Spatz.
By Victor J. Evans
Attorney

UNITED STATES PATENT OFFICE.

ALBERT SPATZ, OF ELSAH, ILLINOIS.

NUT-LOCK.

1,155,286. Specification of Letters Patent. Patented Sept. 28, 1915.

Application filed November 8, 1912. Serial No. 730,265.

*To all whom it may concern:*

Be it known that I, ALBERT SPATZ, a citizen of the United States, residing at Elsah, in the county of Jersey and State of Illinois, have invented new and useful Improvements in Nut-Locks, of which the following is a specification.

The present invention relates to improvements in nut locks.

In carrying out my invention, it is my purpose to provide a simple, but thoroughly effective device which will prevent a nut from becoming accidentally displaced from a bolt.

With the above recited objects in view, and others which will appear as the nature of the invention is more fully understood, the improvement resides in the novel construction, combination and operative arrangement of parts hereinafter fully described and claimed.

In the drawing, there has been illustrated a simple and approved reduction of my invention to practice, but, it is to be understood that the important instrumentalities thereof may be varied, so such changes, as fall within the scope of the appended claim, may be made if desired.

In the drawing, Figure 1 is a central longitudinal sectional view illustrating my improvement in applied position upon the spindle of a vehicle axle. Fig. 2 is a similar view, but illustrating the arrangement of the lock nut when the nut is to be removed from the spindle. Fig. 3 is an elevation of the threaded end of the spindle, the nut being removed. Fig. 4 is a front elevation of the nut. Fig. 5 is a perspective view of the locking element employed with the nut. Fig. 6 is a perspective view of a cap for securing the locking element upon the nut.

While, in the drawing I have illustrated my improved lock nut as attached to the spindle of an ordinary vehicle axle, and while, in the following description I will refer to the several parts in such application, it is to be understood that the improvement is not to be so limited in its useful application, as it will be obvious that the device may be applied for retaining a nut upon a bolt, regardless of the structure to which the bolt is connected.

Referring now to the drawings in detail, the numeral 10 designates the spindle of an axle, the same having its outer edge shouldered and provided with an annular threaded extension 11. The extension is further provided with a reduced annular threaded member 12. The threads of the members 11 and 12 are arranged at opposite pitches, as for instance, the member 12 is adapted to receive a nut provided with, what may be termed, left hand threads, while the member 11 receives a nut which is provided with so called right hand threads.

The numeral 13 designates my improved nut in its entirety. The nut 13 embodies essentially a nut proper, which is designated by the numeral 14. The nut, in the present instance, is formed, adjacent its inner face, with an annular sleeve 15, from which extends an exterior angular portion 16, the said angular portion being so shaped to receive the jaws of a wrench. The nut 14 is provided with a threaded bore 17 which is adapted to coact with the right hand threads upon the portion 11 of the spindle 10. The threaded bore is intersected by an enlarged non-threaded bore 18 which, of course, provides a shoulder between the same and the threaded bore or opening 17.

The numeral 18 designates a lock nut which is adapted to be received within the bore 18. This lock nut has its lower extremity formed with a flange 19, and its outer face, adjacent its end, arranged angularly, as at 20, the said angular portion at all times extending beyond the outer face of the nut 14 and being adapted to serve as a wrench hold whereby the lock nut may be revolved within the bore 18. The bore of the lock nut is provided with left hand threads which are adapted to coact with the threaded extension 12 of the spindle 10 when the nuts are arranged upon the said spindle. Secured to the outer face of the nut 14 is a ring or flange 21, the same snugly embracing the annular periphery of the lock nut, but which, at the same time is adapted to serve as a stop which will contact with the flange of the lock nut to prevent the withdrawal of the said lock nut from the nut 14.

From the above description, taken in connection with the accompanying drawings, the simplicity and advantages of the device will, it is thought, be perfectly apparent to those skilled in the art to which such inventions appertain. It will be understood that owing to the different pitches of the threads of the members 11 and 12, and the nuts engaging the said members, a binding effect will always appear should an attempt be made, or the nut 14 be inclined to become loosened from the threaded portion 11, and also, owing to the fact that the locking nut is at all times retained within the nut 14, an accidental disconnection of the nut from the threaded portions of the spindle cannot occur, and still further that the washer which retains the binding nut within the main nut, prevents the disassociation of the parts, even when the same are purposely removed from the spindle.

Having thus described the invention, what I claim is:

A device of the class described, a spindle having a threaded extension, a nut threadedly mounted on the spindle and having an angular portion hollowed out to form a bore greater in diameter than said extension, a second nut threaded upon said extension at a point in advance of the first nut and having its lower extremity formed with an annular flange, said flange adapted to fit snugly in the bore of the first mentioned nut and to be adjusted longitudinally therein, and a ring secured to the outer face of the first mentioned nut and adapted to engage the flange formed on the lower extremity of the second mentioned nut upon adjustment of the latter to a distance equaling the length of the bore of the first mentioned nut and preventing any accidental loss to said second mentioned nut.

In testimony whereof I affix my signature in presence of two witnesses.

ALBERT SPATZ.

Witnesses:
LEWIS FISSLER,
WILLIAM HUNT.

Copies of this patent may be obtained for five cents each, by addressing the "Commissioner of Patents, Washington, D. C."